(12) United States Patent
Faivre et al.

(10) Patent No.: US 7,357,611 B2
(45) Date of Patent: Apr. 15, 2008

(54) FOLDABLE SHIPPING CONTAINER BULKHEAD

(75) Inventors: Stephen Michael Faivre, Kingston, IL (US); Richard Wayne Hook, West Des Moines, IA (US)

(73) Assignee: Deere & Company, Moline, IL (US)

( * ) Notice: Subject to any disclaimer, the term of this patent is extended or adjusted under 35 U.S.C. 154(b) by 321 days.

(21) Appl. No.: 11/104,000

(22) Filed: Apr. 12, 2005

(65) Prior Publication Data

US 2006/0228185 A1 Oct. 12, 2006

(51) Int. Cl.
*B60P 7/08* (2006.01)

(52) U.S. Cl. ............... 410/140; 410/129; 410/130

(58) Field of Classification Search ........... 410/121, 410/129, 130, 140; 220/1.5, 531, 532, 551; 52/71, 105; 160/370.1, 10; 296/24.4
See application file for complete search history.

(56) References Cited

U.S. PATENT DOCUMENTS

| | | | |
|---|---|---|---|
| 4,080,906 A | 3/1978 | Brown | |
| 4,556,349 A * | 12/1985 | Koudstaal et al. | ........ 410/140 |
| 4,880,342 A | 11/1989 | Pradovic | |
| 4,986,706 A | 1/1991 | Williams, Jr. | |
| 5,244,332 A | 9/1993 | Krein et al. | |
| 5,595,315 A | 1/1997 | Podd et al. | |
| 6,206,623 B1 | 3/2001 | Podd | |
| 6,406,232 B1 | 6/2002 | Snitker et al. | |
| 6,789,987 B2 | 9/2004 | Langh | |

FOREIGN PATENT DOCUMENTS

| | | |
|---|---|---|
| EP | 0 628 449 A1 | 6/1994 |
| JP | 11-1142 | 1/1999 |
| WO | WO 2004/102327 A2 | 11/2004 |

\* cited by examiner

*Primary Examiner*—Stephen Gordon

(57) ABSTRACT

A bulkhead suited for constraining a bulk material within a shipping container. The bulkhead is foldable about a hinge feature, providing for easy manipulation and installation of the bulkhead within the shipping container. The bulkhead is suitable for construction with corrugated cardboard made from materials such as paper or plastic. The bulkhead optionally includes additional features such as a ripcord enabling quick and easy bulk material unloading, and an RFID tag enabling electronic identification and tracking of bulk material contents.

4 Claims, 4 Drawing Sheets

FOLDABLE SHIPPING CONTAINER BULKHEAD

FIELD OF THE INVENTION

The present invention relates to a bulkhead suited for constraining a bulk material within a shipping container.

BACKGROUND OF THE INVENTION

Shipping containers, also known as ISO containers, are commonly used to receive, store, and transport a wide variety of materials from across the world. When used with bulk materials such as grains and milled products, bulkheads installed within the container constrain the material during loading and inspection. Typically, bulkheads are heavy and durable, making them cumbersome to install and remove.

SUMMARY OF THE INVENTION

Presented herein is a bulkhead suited for constraining a bulk material within a shipping container. The bulkhead is foldable about a hinge feature, providing for easy manipulation and installation of the bulkhead within the shipping container. The bulkhead features a ripcord enabling quick and easy bulk material unloading, and an RFID tag enabling electronic identification and tracking of bulk material contents.

DETAILED DESCRIPTION

Figure 1:
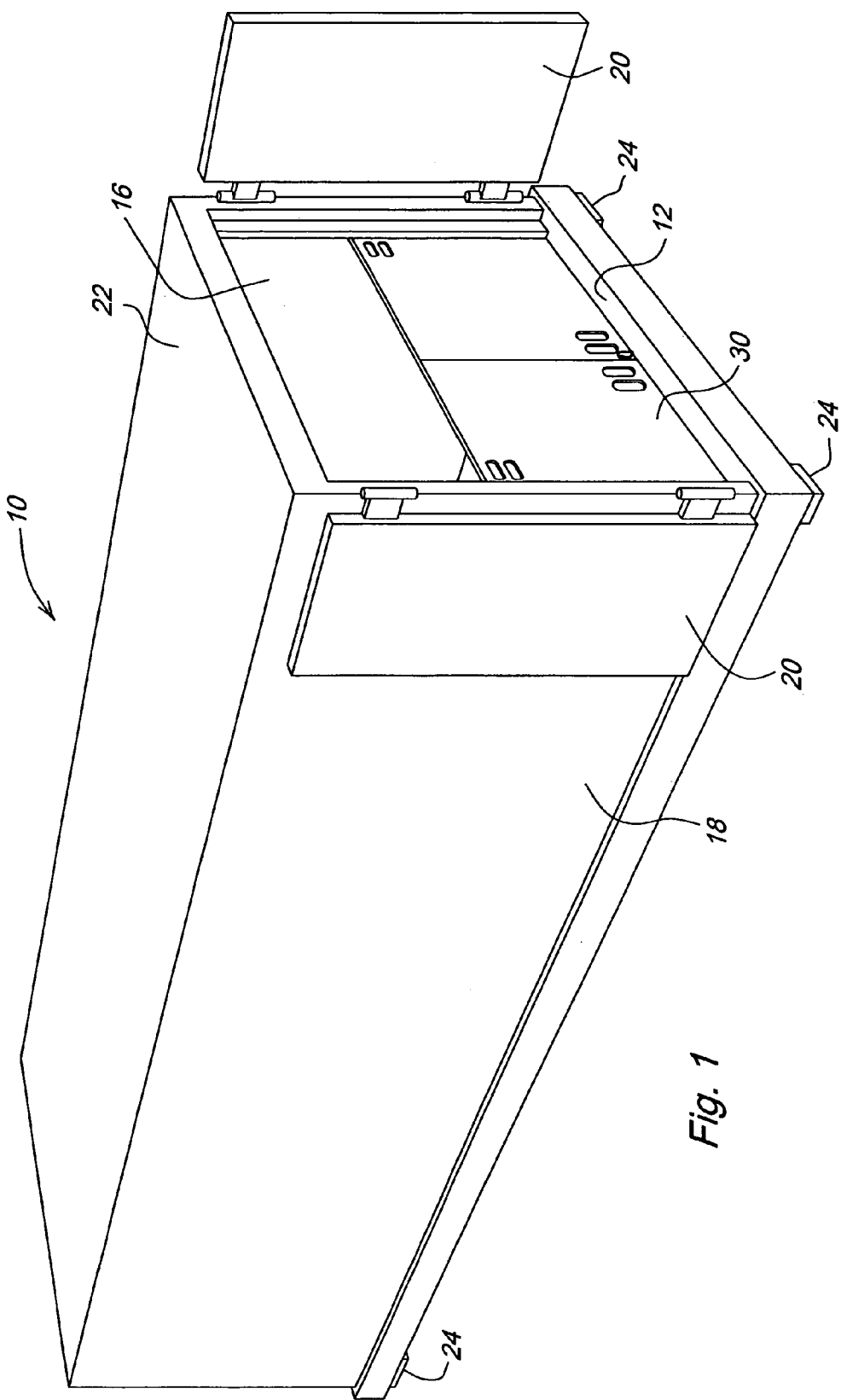
FIG. 1 illustrates a shipping container with foldable bulkhead installed.

FIG. 1 illustrates a typical shipping container 10. Such containers 10, often referred to as ISO containers, are commonly used to receive, store, and transport a wide variety of materials from across the world. A typical container 10 has a load bearing floor 12, a front wall, a right sidewall 16, and a left sidewall 18. Cargo doors 20 provided at the rear of the container 10 allow access to the interior for loading and unloading. The container 10 usually has a roof as shown 22, but may be constructed without such. Loading points 24 enable placement of the container 10 on trailers, railcars, and ships for transport.

Figure 2:
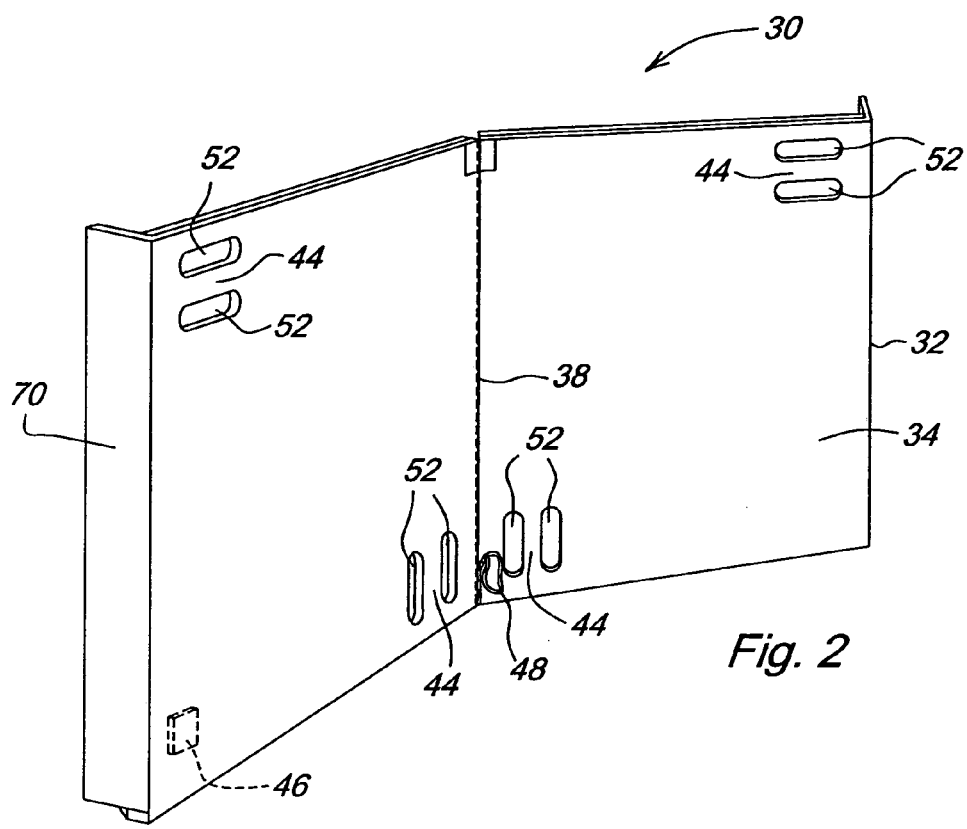
FIG. 2 is a front perspective-view of the foldable bulkhead.
Figure 3:
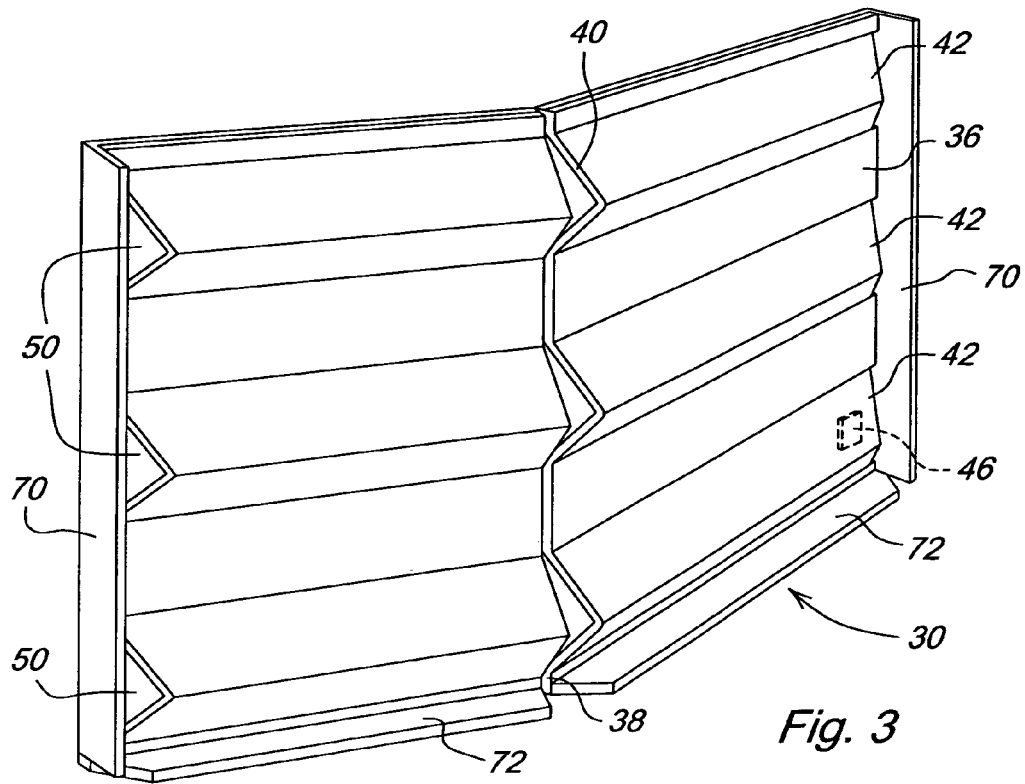
FIG. 3 is a rear perspective-view of the foldable bulkhead.

FIGS. 2 and 3 illustrate a foldable bulkhead 30 for constraining bulk material 100 loaded within the shipping container 10. The bulkhead 30 is comprised of a panel 32 having a front face 34 and a rear face 36, a hinge feature 38 dividing the panel 32 to enable folding for easy manipulation and installation, and an abutment feature 40 to prevent the panel 32 from folding when in use. The bulkhead 30 shown in the illustrated embodiment is suitable for construction with corrugated cardboard made from materials such as paper or plastic. As such, the hinge feature 38 is an integral feature of the cardboard material in the illustrated embodiment. A vertical flange 26 extending inward from both the right sidewall 16 and the left sidewall 18 provide an engagement surface for the front face 34 of the panel 32 when the bulkhead 30 is in use. The flange 26 may be located at any number of points along the wall, including amid ship 28 and near the cargo doors 20. The flange 26 may be embodied as a part of a vertical channel 21 commonly provided near the cargo doors 20, or as a part of a vertical corrugation feature 19 commonly provided with the container walls 16, 18, as shown amid ship 28.

The bulkhead 30 may have additional features to enhance strength and utility. These include buttress features 42 extending across the panel 32 for reinforcement, handles 44 to aid in manipulation and installation, side-flaps 70, and bottom-flaps 72 to better seal the bulk material 100, an RFID tag 46 to enable electronic identification and tracking of the bulk material 100 contents, and a ripcord 48 to enable perforation of the bulkhead 30 for unloading, especially when cardboard is the selected bulkhead material. A hollow conduit 50 extending across the rear face 36 of the panel 32 provides for both the abutment feature 40 and the added buttress feature 42. The conduit 50 may be of any shape, but is shown here as having a triangular cross-section. Ports 52 in the front face 34 of the panel 32 that open into the hollow conduit 50 provide for the handles 44. In this manner, the conduits 50 seal the port 52 opening from the bulk material 100 when the bulkhead 30 is in use. To minimize the possibility of tampering, the RFID tag 46 lays embedded within the panel 32 at a location convenient for sensing by an RFID reader. Finally, the ripcord 48 is embedded within the hinge feature 38 of the bulkhead 30, but could be placed at other locations along the panel 32.

Figure 4:
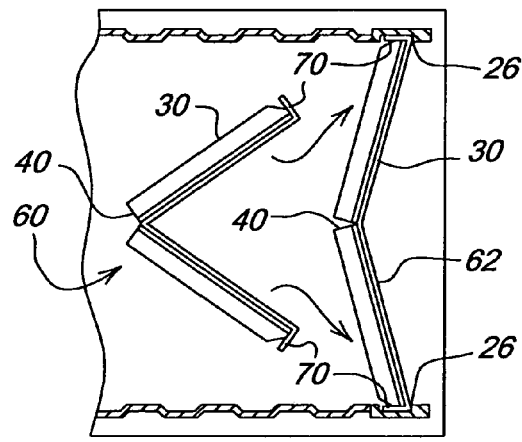
FIG. 4 is a top view illustrating steps for foldable bulkhead installation.
Figure 5:
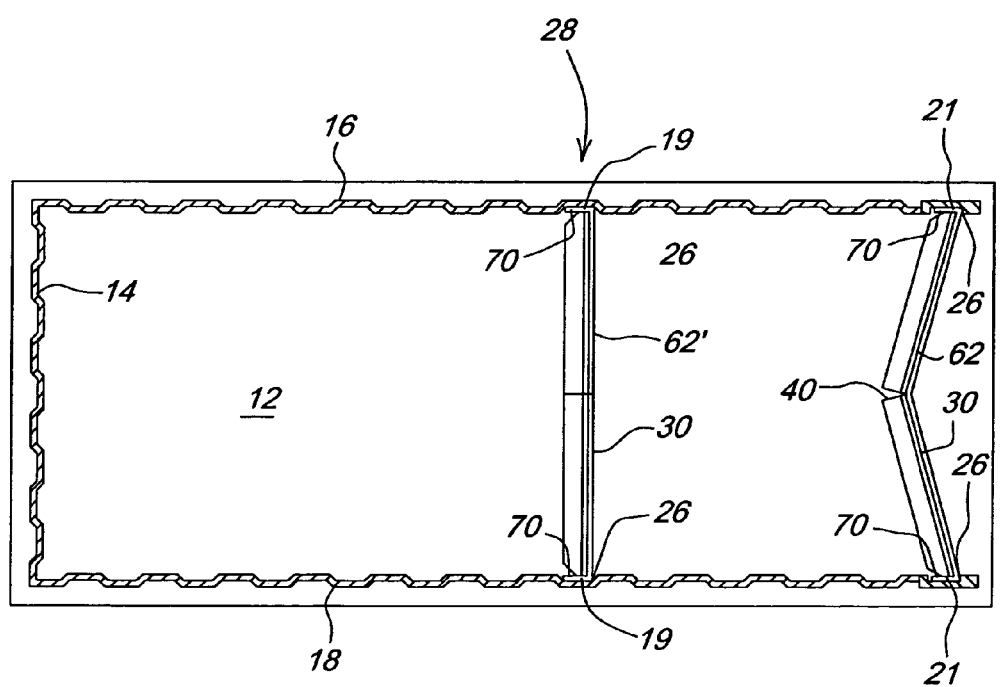
FIG. 5 is a top illustrating working positions for the foldable bulkhead.
Figure 6:
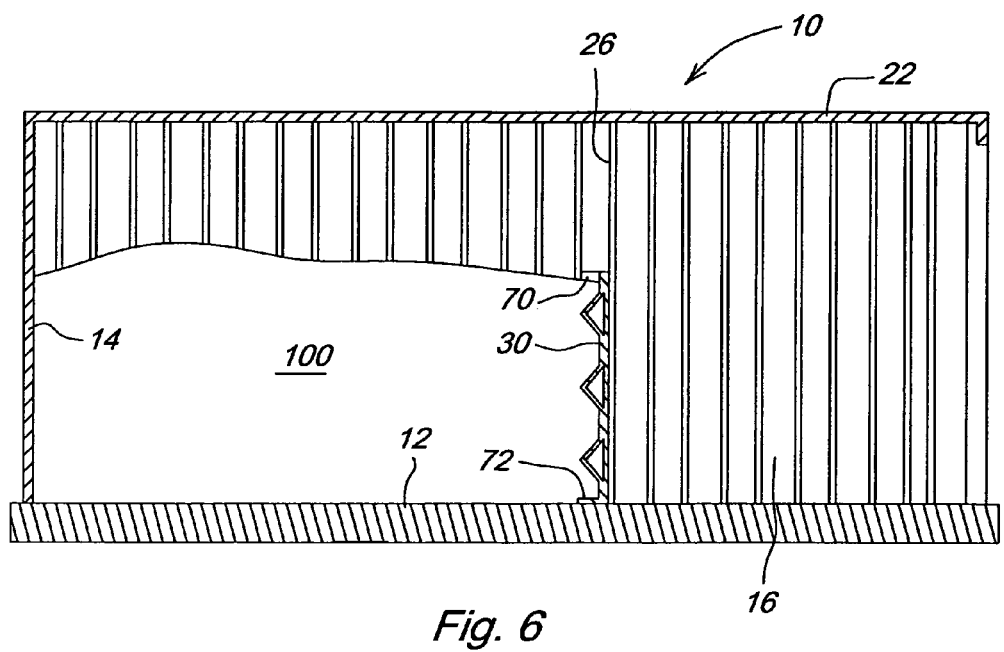
FIG. 6 is a first side illustrating the foldable bulkhead installed.
Figure 7:
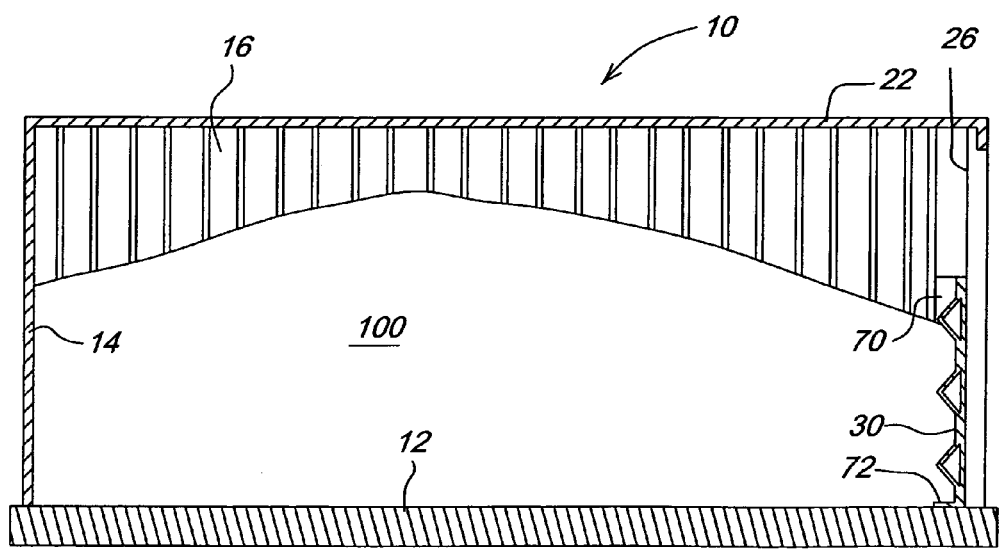
FIG. 7 is a second side illustrating the foldable bulkhead installed.

To use the bulkhead 30 within the container 10, an individual places the bulkhead 30 within the container 10 in a folded position 60 with the rear face 36 towards the front wall 14, with bottom-flaps 72 resting on the floor 12. The individual then unfolds the bulkhead 30, pulling the front side of the panel 32 toward the flange features 26 located on the sidewalls of the container 10. The operator continues this until the bulkhead 30 reaches a working position 62 in FIG. 4. The bulkhead 30 reaches the working position 62 when either the side-flaps 70 fully rest against the sidewalls 16, 18 of the container 10, or the panel 32 reaches an unfolded working position 62' as shown in FIG. 5. Once installed, the operator adds bulk material 100 to container 10 on the rear face 36 side of the panel 30. The pressure exerted by the bulk material 100 against the rear face 36 holds the front face 34 against the flanges 26, thereby positively securing the bulkhead 30 in place as shown in FIGS. 6 and 7. Additionally, the pressure exerted against the side-flaps 70 and bottom-flaps 72 positively seals the bulkhead 30 against the floor 12 and sidewalls 16, 18.

To identify and track the bulk material 100 during storage or transport, an individual opens the cargo doors 20 to access the portion of the bulkhead 30 containing the RFID tag 46. The operator then scans the tag 46 with an RFID reader to obtain information stored therein. To unload the bulk material 100 constrained by the bulkhead 30, an operator pulls the ripcord 48, creating a perforation in the bulkhead 30. From this, pressure exerted by the bulk material 100 may further open the perforation and dislodge the bulkhead 30 from the container 20, or if not, the operator may manually remove the bulkhead 30. Once removed, the bulkhead 30 may be partially recycled or disposed of entirely.

Having described the illustrated embodiments, it will become apparent that various modifications can be made without departing from the scope of the invention as defined in the accompanying claims.

The invention claimed is:

1. A bulkhead for constraining a bulk material within a container having a floor and sidewalls, each sidewall having at least one vertical flange extending inward therefrom, the bulkhead comprising:
   a panel having a front face and a rear face;
   a hinge feature operatively dividing the panel;
   an abutment feature preventing the panel from folding toward the rear face;
   a ripcord enabling perforation of the panel for unloading the bulk material;
   an RFID tag enabling electronic identification of the bulkhead;
   wherein the bulkhead has a working position with the front face of the panel being held against the vertical flanges of the container by pressure exerted upon the rear face of the panel by the bulk material constrained therein.

2. The bulkhead described in claim 1 further comprising a flap for sealing the bulkhead against at least one of a sidewall and the floor.

3. The bulkhead described in claim 1 further comprising one or more handles enabling manipulation of the bulkhead.

4. The bulkhead described in claims 1, 2, or 3 wherein the bulkhead being constructed from a cardboard material.

* * * * *